United States Patent
Taylor

[11] 3,909,108
[45] Sept. 30, 1975

[54] OPTICAL SWITCH AND MODULATOR
[75] Inventor: Taylor Henry F., San Diego, Calif.
[73] Assignee: The United States of America as represented by the Secretary of the Navy, Washington, D.C.
[22] Filed: May 28, 1974
[21] Appl. No.: 473,966

[52] U.S. Cl. ...... 350/96 WG; 350/96 C; 350/160 R
[51] Int. Cl.² .................. G02B 05/14; G02F 01/29
[58] Field of Search .......................... 356/96 WG

[56] References Cited
UNITED STATES PATENTS
| | | | |
|---|---|---|---|
| 3,408,131 | 10/1968 | Kapany | 350/96 WG |
| 3,589,794 | 6/1971 | Marcatili | 350/96 WG |
| 3,781,081 | 12/1973 | Rokos | 350/96 WG |

Primary Examiner—Robert Segal
Attorney, Agent, or Firm—R. S. Sciascia; G. J. Rubens; J. W. McLaren

[57] ABSTRACT

First and second optical waveguides are disposed along a coextensive parallel length sufficient in relation to the distance of propagation of optical energy for light transfer from one guide to the other. Thus, light propagating along one guide of the parallel waveguide arrangement will emerge from the other optical waveguide. Electrodes are disposed contiguous to the waveguides for generating electric fields of opposite sense upon the application of an electrical potential. Antisymmetric changes are thus induced in the refractive indices of the optical waveguides causing the light energy to be coupled back into the originally energized waveguide and modulating the intensity of the outputs of both waveguides.

4 Claims, 4 Drawing Figures

OPTICAL SWITCH AND MODULATOR

BACKGROUND OF THE INVENTION

In optical communications and data transmission systems it is frequently desirable to be able to couple light energy into and out of optical paths carrying signal information. The purpose of coupling such light energy into or out of optical paths may be to perform switching and/or modulating functions.

Switching or deflecting light energy from one optical path to another has been performed in the prior art by the mechanical motion of a deflecting mirror or by the interaction of the light energy with an acoustic wave in a selected medium which the optical energy traverses.

Undesirably, however, many of the devices employed in prior art practices for switching, deflecting, and modulating optical energy are relatively large in size and also undesirably slow in operative responsivity as well as often requiring comparatively large electrical power inputs.

In a variant prior art practice, light energy has been coupled out of optical paths in optical communication and data transmission systems by the use of a grating coupler, for instance, which employs a periodic diffraction grating on the surface of the material comprising an optical path, such as the core area of a fiber optic element having the cladding removed.

In the practice of that type of prior art technique photoresist material may be used to fabricate the diffraction grating. The use of such a light coupling device, however, inherently involves a number of limitations including (1) only one state of active operation, that being the "on" state, and (2) its construction renders it tuned to only one particular wavelength defined by the diffraction grating period as established in its fabrication.

Active versions of diffractive grating optical couplers have been proposed which are designed to eliminate either one or both of these principal limitations. However, such active versions, in turn, inherently involve limitations of the data rate of signal information which may be coupled through the use of the diffraction grating device. Additionally, some limitations are imposed upon the waveguide material that may be used when an "off" capability is added.

Another prior art alternative which may be employed to couple light out of an optical path is the use of a prism coupler. The prism coupler technique is practiced by situating a prism at a certain critical distance proximate to the optical path so that frustrated photo reflection is upheld.

In the practice of this latter technique the magnitude of the light leakage is dependent upon the thickness and the refractive index of the film of material which comprises the optical path, the refractive index of the prism and of the waveguide, the angle of the incident beam and the wavelength of the light energy involved as well as its planar polarization.

Critical dependence upon these parameters in the employment of the prism type optical coupler gives rise to a number of disadvantages also; these include (1) critical air gap tolerance, (2) only one state of operation unless very sophisticated mechanical placement devices are used to move the prism in and out in relation to the optical path, and (3) data rate limitation for the active version of such a device.

Accordingly, there is a need for a broadband optical switch and/or modulator which will selectively couple light energy from one light path to another and also minimize or eliminate disadvantages of known prior art practices.

SUMMARY OF THE INVENTION

The optical switch and modulator of the present invention provides a broadband means for selectively coupling optical energy from one light path to another. In one of its simplest and more fundamental embodiments the present invention may comprise a first optical waveguide positioned to receive the light energy and a second optical waveguide disposed parallel to the first optical waveguide along a predetermined co-extensive length. Such waveguides may comprise planar or channel waveguides of suitable materials disposed on a dielectric substrate.

The propagation constant for a guided mode of the second optical waveguide is substantially equal to the propagation constant of a guided mode of the first optical waveguide for causing a shift of the center of guided wave energy distribution from the first optical waveguide to the second optical waveguide within the previously mentioned predetermined co-extensive length. Accordingly, light energy will be coupled from one optical waveguide to the other optical waveguide within the predetermined co-extensive length which may be termed the coupling length.

The materials of the substrate and the waveguides are electro-optic in nature such that an electric field in the waveguide material causes a change in its refractive index as a function of the electric field. Suitable materials for the waveguides may comprise CdS, ZnSe, $LiNbO_3$, $LiTaO_3$, or GaAs, for example. The two parallel optical waveguides may be spaced a distance apart approximately of the order of an optical wavelength of the light energy which is to be transferred between them. The exact spacing, however, depends upon dimensions of the waveguides and the refractive indices of the waveguide and substrate materials as well.

Electrodes are disposed contiguous to the optical waveguides for generating electric fields across the optical waveguides upon connection to an electrical potential. A suitable switch or comparable means is provided for selectively connecting the source of electrical potential to pairs of electrodes for creating electric fields across the respective optical wave guides in an opposite sense.

The electric fields of opposite sense thus generated induce commensurate changes of opposite sense in the refractive indices of the two optical waveguides. Accordingly, while the refractive index of one of the optical waveguides is effectively reduced, the refractive index of the other optical waveguide is effectively increased. The total result under the described conditions upon application of the electrical potential to the electrodes, is to decrease the coupling length or distance over which light energy is transferred from one optical waveguide to the other optical waveguide.

Preferably, the coupling length is reduced by a factor of two causing light energy propagating along the first optical waveguide to be coupled out of it and back into it so that it emerges from the same first optical waveguide. In the absence of the application of an electrical potential to the electrodes to create electric fields of opposite sense across the two optical waveguides, light propagating along the first optical waveguide is coupled into the second optical waveguide within their predetermined co-extensive length and such coupled light energy emerges from the termination of the second optical waveguide so that a switching function has been given effect.

In a preferred embodiment of the present invention one electrode is disposed on the dielectric substrate midway between the first and second optical waveguides while second and third electrodes are disposed outside the first and second optical waveguide, respectively. Accordingly, in such a preferred arrangement one side of the source of electrical potential may be connected to the centrally disposed electrode while the other side of the electric potential is connected to both of the outside electrodes.

Thus, in accordance with the requirements of the present invention, electric fields of opposite sense will be generated across the first and second optical waveguides causing antisymmetric changes in the refractive indices of the two optical waveguides and a commensurate shortening of the coupling length along the predetermined coextensive length of the two optical waveguides.

This preferred arrangement for the electrodes and their connection to the source of electrical potential desirably minimizes reactive impedance affording improved operation of the device.

Accordingly, it is a primary object of the present invention to provide an optical switch and modulator for selectively coupling light energy from one light path to another without the attendant disadvantages of functionally comparable prior art devices.

Another most important object of the present invention is to provide such an optical switch and modulator which is operative by wholly electrical means.

Yet another important object of the present invention is to provide such an optical switch and modulator which is capable of very rapid operation in both switching and modulating functions.

A further object of the present invention is to provide a comparatively broadband optical coupler capable of both switching and modulating light energy.

Another object of the present invention is to provide an optical switch and modulator which functions in a short path length device.

Yet another further important object of the present invention is to provide such an optical switch and modulator which is responsive to comparatively small electrical power inputs.

These and other features, objects, and advantages of the present invention will be better appreciated from an understanding of the operative principles of a preferred embodiment as described hereinafter and as illustrated in the accompanying drawings.

DESCRIPTION OF THE PREFERRED EMBODIMENTS

Multiple switching and intensity modulation are two important input-output functions which are required of optical communications and data transmission systems. While the long lines functions of such optical systems may be suitable performed by fiber optic elements, the switching and modulation functions may preferably be performed by integrated optic circuits.

Either switching or modulation can be accomplished by varying the coupling length for two parallel single mode dielectric optical waveguides as has been disclosed and taught by E. A. J. Marcatili in Volume 48 of the Bell System Technical Journal, beginning at page 2103 and by N. S. Kapany in U.S. Pat. No. 3,408,131, issued Oct. 29, 1968.

The coupling length L may be defined as the distance of propagation required for light energy to be transferred from one optical waveguide to another optical waveguide disposed in a coupling relationship. Stated another way, when the propagation constant for a guided mode of one optical waveguide is substantially equal to the propagation constant for a guided mode of another adjacent parallel optical waveguide, a shift of the center of guided wave energy distribution is caused from the first optical waveguide to the second waveguide within some predetermined coextensive length along their parallel disposition. That distance may be defined as the coupling length, since the result is that light energy is coupled between the two optical waveguides.

Figure 1:
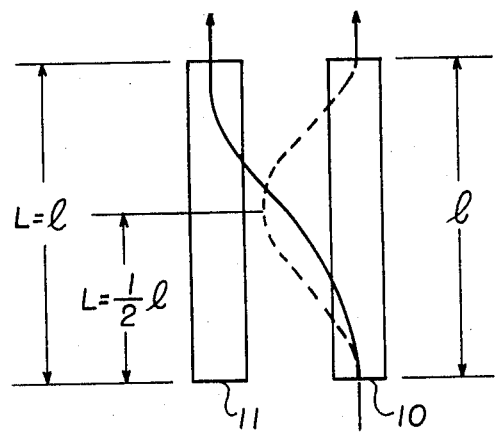
FIG. 1 is an illustration of the transfer of light energy between parallel waveguides.

Thus, light propagating along one optical waveguide of the parallel waveguide arrangement illustrated schematically in FIG. 1 will emerge from the other optical waveguide as schematically illustrated by the solid line representation between the two optical waveguides shown in FIG. 1. However, when the coupling length L is reduced by a factor of two, light propagating along the first optical waveguide (on the right-hand of FIG. 1) is switched to emerge as an output from the originally excited first optical waveguide and light energy in both the optical waveguides is intensity modulated as illustrated schematically in FIG. 1.

The coupling length may be altered by a change in the refractive index profile for the two waveguide structure. A particular case in which the refractive index of the waveguide cores is held constant while that of the surrounding medium is changed has been treated in the previously referenced publication by Marcatili as well as in U.S. Pat. No. 3,589,794, issued to him on June 29, 1971. The refractive index change in the Marcatili disclosures is however symmetric with respect to a plane midway between the two optical waveguides.

By contrast, applicant's concept employs a change in refractive index which is antisymmetric relative to the two optical paths involved. The theoretical basis of applicant's concept is disclosed in a paper titled Optical Switching and Modulation in Parallel Dielectric Waveguides published in the July 1973 Journal of Applied Physics, Volume 44, No. 7.

As stated in that paper, the electromagnetic distribution for the guided modes of a parallel optical guide structure is assumed to be a linear combination of the fields for isolated optical waveguides. Linear coefficients and propagation constants are then determined by the variation method. A formula for the dependence of guided wave field distribution on the distance of light energy propagation is obtained and based on these results an expression for the minimum parallel optical waveguide path length required for a switching and/or modulation is developed. Finally, the effectiveness of antisymmetric vs, symmetric refractive index changes for switching and/or modulation is compared for both slab and square cross section optical waveguide geometry.

FIG. 1 illustrates coupling between two parallel optical paths in the form of waveguides. As indicated by the solid line, optical energy traversing the optical waveguide 10 is coupled into the optical waveguide 11 through the length L which may be defined as the distance required to cause a shift of the center of guided light energy distribution from one optical waveguide 10 to a second optical waveguide 11.

The optical phenomenon occurs when the propagation constant for a guided mode of one optical waveguide, such as that illustrated at 10, is equal to the propagation constant of a guided mode of the other optical waveguide, such as that illustrated at 11. The coupling length L may be reduced by an appropriate change in the refractive index profile for the dual optical waveguide configuration. When such reduction of the coupling length L takes place, light energy is coupled out of the optical waveguide 10 toward the other optical waveguide 11 and then back to the optical waveguide 10 so that the light energy emerges from the originally excited optical waveguide 10 and the outputs of both optical waveguides 10 and 11 are intensity modulated.

Figure 2:
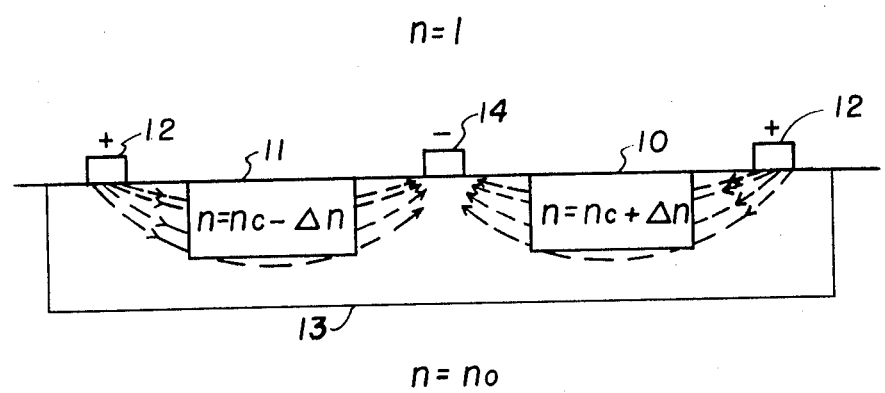
FIG. 2 is an illustration of the electric fields which may be developed across adjacent optical waveguides.

FIG. 2 illustrates the effect of an electric field upon the refractive indices of two optical waveguides disposed in parallel configuration. In the illustration of FIG. 2 (n represents refractive index,) $n_c$ represents the refractive index of the cores of the optical waveguides 10 and 11, $\Delta n$ represents the change of refractive index caused by the electric field, and $n_0$ represents refractive index of the medium in which the optical waveguides 10 and 11 are embedded.

From FIG. 2 is can be seen that appropriately disposed electrodes 12 and 13 may be employed contiguous to the optical waveguides 10 and 11 for generating electric fields of opposite sense across the respective waveguides 10 and 11 upon the connection of the electrodes 12 and 13 to an electrical potential of the polarity symbolically illustrated.

Figure 3:
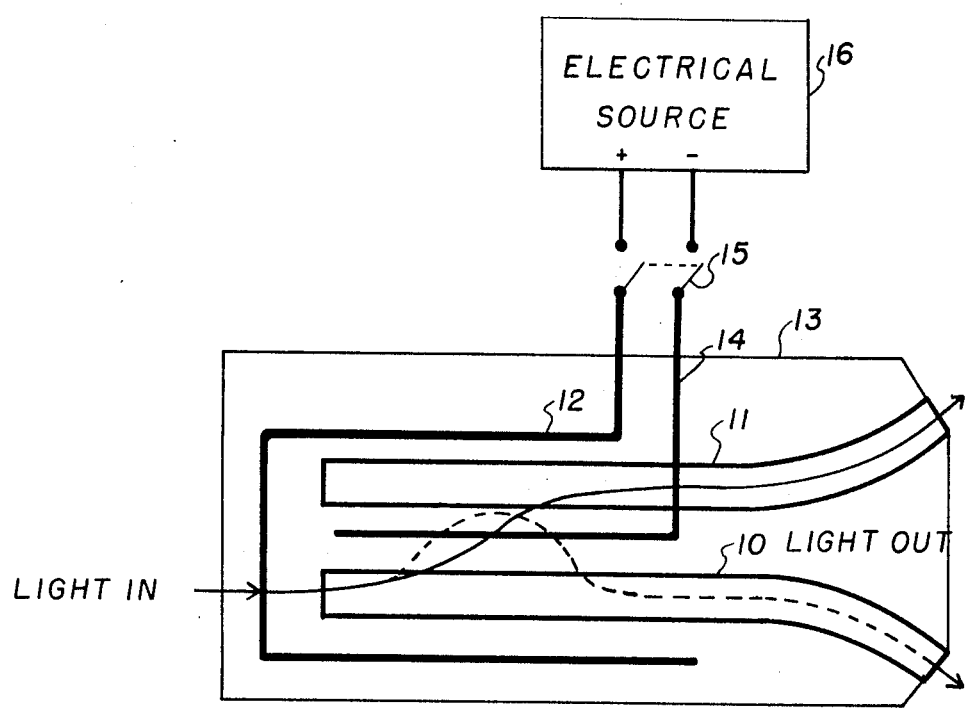
FIG. 3 is an illustration of an embodiment of the present invention.

FIG. 3 illustrates a preferred embodiment of the present invention wherein first and second optical waveguides 10 and 11 are arranged for a portion of their length in parallel disposition. An electrode 12 is arranged on a dielectric substrate 13 to form a continuous electrical path encompassing the outside of both optical waveguides 10 and 11; a second electrode 14 is positioned midway between a parallel section of the optical waveguides 10 and 11. A switch 15 is arranged to selectively connect a source of electrical potential 16 to the two electrodes 12 and 14 so that the electrode 12 is energized with a positive potential and the electrode 14 is energized with a negative potential. Because of the arrangement of the electrodes 12 and 14 on the dielectric substrate 13 as illustrated in FIG. 3 it will be appreciated that electric fields of opposite sense are generated across the respective optical waveguides 10 and 11 upon connection of the source of electrical potential 16 through the selectively operative switch 15.

In its operation, the arrangement illustrated in FIG. 3 functions in the absence of electric fields to couple light out of the optical waveguide 10 into the optical waveguide 11 so as to perform a switching function from one optical path to another, in the sense that light which initially entered the optical waveguide 10 as indicated by the solid line in the drawing emerges from the optical waveguide 11.

However, upon the application of a source of electrical potential to the electrodes 12 and 14, electric fields of opposite sense are generated across the respective optical waveguides 10 and 11, changing the refractive index antisymmetrically so as to reduce the coupling length approximately by a factor of two. Accordingly, under these latter conditions light entering the optical waveguide 10 is coupled toward the optical waveguide 11 in approximately one-half the length of the previously described conditions and then is coupled back into the optical waveguide 10 which it originally traversed as indicated by the dash lines in FIG. 3.

Thus, the concept of the present invention affords a high speed, low power, most effective means for switching optical energy and also performing modulation functions. It will be apparent to those skilled in the art that light initially transferred by coupling from the optical waveguide 10 to the optical waveguide 11 as indicated by the dash lines will continue to be propagated along the optical waveguide 11.

Furthermore, because such propagation is under the control of the application of the described antisymmetric changes of refractive indices by reason of the application of electric fields of opposite sense, modulation of light along both the optical waveguides 10 and 11 and their associated optical paths can be realized.

Additionally, the optical coupler of the present invention is a desirably broadband device, typical embodiments of the described configurations being operative over a spectral region of approximately 1,000A.

Figure 4:
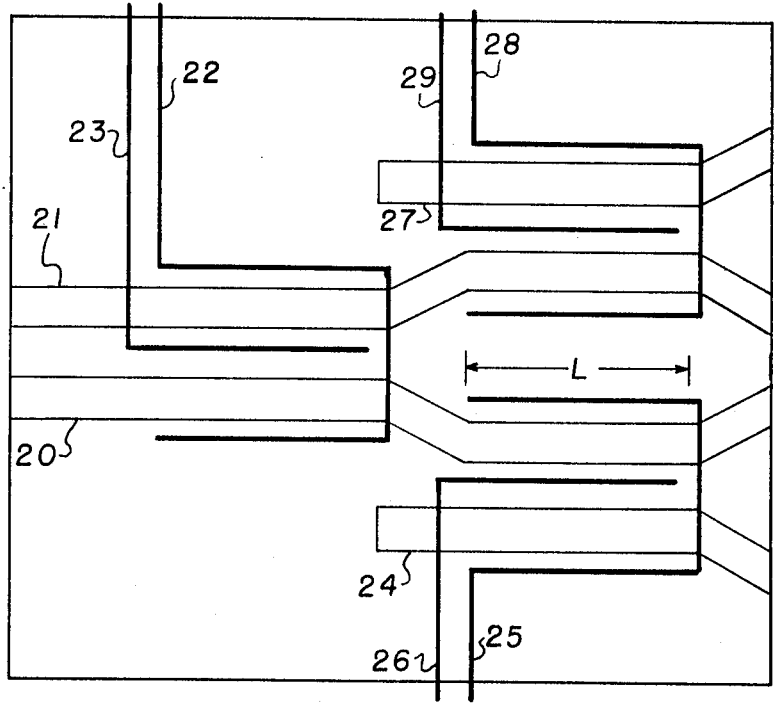
FIG. 4 is an illustration of a variant embodiment of the present invention including multiple switch and modulation functions.

FIG. 4 illustrates a variant embodiment of the present invention affording multiple switching and modulating functions. In FIG. 4 an optical waveguide 20 is disposed in parallel relationship for a distance equal to the coupling length L relative to an associated optical waveguide 21. Electrodes 22 and 23 are disposed contiguous to the optical waveguides 20 and 21 for generating electric fields of opposite sense and thereby causing an antisymmetric change in the respective refractive indices of the optical waveguides 20 and 21 upon the application of a source of electrical potential.

However, in the absence of the application of an electrical potential, no electric field exists to change the quiescent condition of coupling and therefore the light entering the optical waveguide 20 from the left-hand side of FIG. 4, as indicated by the arrow, will be coupled into the optical waveguide 21 and propagated therealong to a portion of optical waveguide 21 which is disposed in parallel relationship with an additional optical waveguide 27 for a distance approximating the coupling length L.

In the absence of electrical fields applied to the contiguous parallel portions of optical waveguides 21 and 27, light propagating along the optical waveguide 21 will be coupled into the optical waveguide 27 and emerge therefrom at the right-hand termination of that portion of optical waveguide 27. However, upon the application of a suitable electrical potential to the electrodes 28 and 29, electric fields of opposite sense will be generated across the parallel portions of optical waveguides 21 and 27, causing an antisymmetric change in their respective refractive indices so as to control the re-entry of light energy into optical waveguide 21, causing it to emerge at the termination of that portion of the illustration of FIG. 4.

In a similar manner, another optical waveguide 24 is disposed in parallel relative to a portion of the optical waveguide 20. Light propagating along the optical waveguide 20 will, under quiescent conditions, be coupled into the optical waveguide 24 and emerge at the termination of that portion of optical waveguide 24 illustrated in the right-hand section of the illustration of FIG. 4.

However, upon the application of a suitable electrical potential to the electrodes 25 and 26, electric fields of opposite sense are generated across the parallel portions of the optical waveguides 20 and 24 to give effect to the continued propagation of optical energy along the optical waveguide 20 and its emergence at the termination of the optical waveguide 20 on the right-hand portion of the illustration of FIG. 4.

Those knowledgable and skilled in the art will readily recognize that a type of embodiment illustrated in FIG. 4 may be rendered operative as a two-state device generally analogous to an electrical double pole, double throw, reversing switch. That is to say for one state, light entering one of the waveguides emerges from the other one and in the second state light emerges from the same waveguide as it entered. Optical networks can therefore in principle be made up of binary electro-optic switches interconnected by dielectric optical waveguides on a single substrate generally in the manner a portion of which is illustrated schematically in FIG. 4.

Within the concept of the present invention it is accordingly feasible to produce optical switching and modulation by inducing comparatively modest changes in refractive index over a relatively short path length in thin film optical devices.

The large refractive index differences of the core material of the optical waveguide relative to the substrate on which it is supported are necessary for short path length devices with low crosstalk but could be readily obtained by solid state diffusion using electron beam techniques which have been developed by the semiconductor industry for mask pattern definition.

Thus, the concept of the present invention can be readily practiced within the most desirable techniques of pertinent, advanced technologies.

Obviously many modifications and variations of the present invention are possible in the light of the above teachings. It is therefore to be understood that within the scope of the appended claims the invention may be practiced otherwise than as specifically described.

What is claimed is:

1. An optical switch and modulator for selectively coupling light energy from one light path to another comprising:
   a first optical waveguide positioned to receive said light energy;
   a second optical waveguide disposed parallel to said first optical waveguide along a predetermined co-extensive length;
   the propagation constant for a guided mode of said second optical waveguide being substantially equal to the propagation constant of a guided mode of said first optical waveguide for causing a shift of the center of guided-wave energy distribution from said first optical waveguide to said second optical waveguide within said predetermined co-extensive length and coupling light energy therebetween;
   a source of electrical potential;
   electrodes disposed contiguous to said first and second optical waveguides along said predetermined co-extensive length for generating electric fields of opposite sense thereacross upon common connection to an electrical potential; and
   means for selectively connecting said source of electrical potential to said electrodes, inducing simultaneous changes of opposite sense in the refractive indices of said waveguides for controlling the coupling of light energy therebetween.

2. An optical switch and modulator as claimed in claim 1 wherein said predetermined coextensive length is substantially equal to the distance of optical propagation required for light energy to be transferred from one optical waveguide to the other optical waveguide.

3. An optical switch and modulator as claimed in claim 1 wherein said first and second optical waveguides are spaced from each other by a distance of the order of one optical wavelength of the light energy to be transferred therebetween.

4. An optical switch and modulator as claimed in claim 1 wherein one of said electrodes is disposed between said first and second optical waveguides.

* * * * *